United States Patent
Vonend

(10) Patent No.: US 11,186,343 B2
(45) Date of Patent: Nov. 30, 2021

(54) MULTI-PINION ARRANGEMENT AND BICYCLE DRIVE HAVING A MULTI-PINION ARRANGEMENT OF SAID TYPE

(71) Applicant: SRAM Deutschland GmbH, Schweinfurt (DE)

(72) Inventor: Andreas Vonend, Schweinfurt (DE)

(73) Assignee: SRAM Deutschland GmbH, Schweinfurt (DE)

( * ) Notice: Subject to any disclaimer, the term of this patent is extended or adjusted under 35 U.S.C. 154(b) by 737 days.

(21) Appl. No.: 15/849,068

(22) Filed: Dec. 20, 2017

(65) Prior Publication Data

US 2018/0178882 A1 Jun. 28, 2018

(30) Foreign Application Priority Data

Dec. 23, 2016 (DE) ...................... 10 2016 015 433.0

(51) Int. Cl.
| | |
|---|---|
| *B62M 9/10* | (2006.01) |
| *B62M 9/12* | (2006.01) |
| *B62M 9/04* | (2006.01) |
| *B62M 9/00* | (2006.01) |
| B62M 9/1246 | (2010.01) |
| B62M 9/126 | (2010.01) |
| B62M 9/16 | (2006.01) |

(52) U.S. Cl.
CPC ................ *B62M 9/10* (2013.01); *B62M 9/04* (2013.01); *B62M 9/105* (2013.01); *B62M 9/12* (2013.01); *B62M 9/126* (2013.01); *B62M 9/1246* (2013.01); *B62M 9/16* (2013.01); *B62M 2009/005* (2013.01)

(58) Field of Classification Search
CPC .......... B62M 9/10; B62M 9/105; B62M 9/12; B62M 2009/005; F16H 55/30
USPC ......................................................... 474/160
See application file for complete search history.

(56) References Cited

U.S. PATENT DOCUMENTS

| 4,174,642 A | * | 11/1979 | Martin | .................... F16H 55/30 |
| | | | | 474/152 |
| 6,203,462 B1 | * | 3/2001 | Takamori | ................. B62M 9/02 |
| | | | | 474/156 |
| 9,669,899 B2 | * | 6/2017 | Barefoot | .................. B62M 9/00 |
| 9,885,409 B1 | * | 2/2018 | Fukunaga | ........... F16H 57/0006 |

(Continued)

FOREIGN PATENT DOCUMENTS

| DE | 69708118 T2 | 4/2002 |
| DE | 69824571 T2 | 8/2005 |

(Continued)

*Primary Examiner* — Michael R Mansen
*Assistant Examiner* — Raveen J Dias

(57) ABSTRACT

A bicycle drive includes a multi-sprocket arrangement for rotatable mounting on a rear-wheel axle an engagement with a bicycle chain having inner link plate pairs and chain outer link plate pairs. The multi-sprocket arrangement includes a sprocket having, between an axial inner side and an oppositely situated axial outer side, a flat sprocket body and a plurality of teeth formed on a circumference of the sprocket. The plurality of teeth include at least one tooth of a first tooth group, the axial width of which is dimensioned to be greater than a chain inner link plate spacing and smaller than a chain outer link plate spacing, and a second tooth group, the axial width of which are dimensioned to be smaller than the chain inner link plate spacing.

18 Claims, 9 Drawing Sheets

(56) References Cited

U.S. PATENT DOCUMENTS

| | | | |
|---|---|---|---|
| 2007/0054768 A1* | 3/2007 | Miyazawa | F16H 55/30 474/152 |
| 2007/0060428 A1* | 3/2007 | Meggiolan | B62M 9/10 474/160 |
| 2008/0058144 A1* | 3/2008 | Oseto | B62M 9/10 474/160 |
| 2009/0042682 A1* | 2/2009 | Dal Pra' | B62M 9/10 474/160 |
| 2011/0092327 A1* | 4/2011 | Oishi | B62M 9/10 474/160 |
| 2011/0105263 A1* | 5/2011 | Braedt | B62M 9/10 474/160 |
| 2013/0139642 A1* | 6/2013 | Reiter | B62M 9/08 74/594.2 |
| 2013/0184110 A1* | 7/2013 | Reiter | F16H 55/30 474/152 |
| 2014/0338494 A1 | 11/2014 | Sugimoto et al. | |
| 2014/0364259 A1* | 12/2014 | Reiter | B62M 9/10 474/155 |
| 2015/0024884 A1* | 1/2015 | Braedt | F16H 9/24 474/78 |
| 2015/0094179 A1* | 4/2015 | Iwai | F16H 55/30 474/152 |
| 2015/0198231 A1* | 7/2015 | Emura | F16H 7/06 474/156 |
| 2015/0217834 A1* | 8/2015 | Iwai | B62M 9/105 474/152 |
| 2015/0226305 A1* | 8/2015 | Pfeiffer | B62M 9/105 474/152 |
| 2015/0226306 A1* | 8/2015 | Pfeiffer | B62M 9/105 474/152 |
| 2015/0226307 A1* | 8/2015 | Pfeiffer | B62M 9/105 474/152 |
| 2015/0226308 A1* | 8/2015 | Pfeiffer | B62M 9/10 474/152 |
| 2015/0285362 A1* | 10/2015 | Pfeiffer | B62M 9/10 474/152 |
| 2015/0285363 A1* | 10/2015 | Pfeiffer | F16H 55/30 474/152 |
| 2015/0285364 A1* | 10/2015 | Pfeiffer | F16H 55/30 474/152 |
| 2015/0291255 A1* | 10/2015 | Nishimoto | B62M 9/06 474/152 |
| 2015/0337943 A1* | 11/2015 | Sugimoto | B62M 9/02 474/152 |
| 2015/0362057 A1* | 12/2015 | Wesling | B62M 9/10 474/152 |
| 2016/0101825 A1* | 4/2016 | Braedt | B62M 9/10 474/160 |
| 2016/0208903 A1* | 7/2016 | Goates | B62M 9/105 |
| 2016/0347409 A1* | 12/2016 | Watarai | B62M 9/02 |
| 2017/0029066 A1* | 2/2017 | Fukunaga | F16H 55/303 |
| 2017/0045121 A1* | 2/2017 | Staples | B62M 9/105 |
| 2017/0183060 A1* | 6/2017 | Braedt | F16H 55/30 |
| 2017/0247081 A1* | 8/2017 | Sugimoto | B62M 9/10 |
| 2017/0283005 A1* | 10/2017 | Inoue | F16H 55/30 |
| 2017/0355422 A1* | 12/2017 | Sugimoto | B62M 9/12 |
| 2017/0370460 A1* | 12/2017 | Akanishi | F16H 55/30 |
| 2017/0370462 A1* | 12/2017 | Akanishi | B62M 9/00 |
| 2018/0079467 A1* | 3/2018 | Hirose | B62M 9/12 |
| 2018/0127057 A1* | 5/2018 | Sugimoto | B62M 1/36 |
| 2018/0134340 A1* | 5/2018 | Emura | B62M 9/105 |
| 2018/0141615 A1* | 5/2018 | Sugimoto | B62M 9/12 |
| 2018/0178880 A1* | 6/2018 | Akanishi | B62M 9/10 |
| 2018/0194433 A1* | 7/2018 | Dos Santos | B62M 9/126 |
| 2018/0202531 A1* | 7/2018 | Ooishi | F16H 55/30 |
| 2018/0290712 A1* | 10/2018 | Taniguchi | F16H 55/30 |
| 2018/0299004 A1* | 10/2018 | Ohno | F16H 55/30 |
| 2019/0017586 A1* | 1/2019 | Sugimoto | F16H 55/30 |
| 2019/0031288 A1* | 1/2019 | Kamada | B62M 9/10 |
| 2019/0061875 A1* | 2/2019 | Reineke | B62M 9/105 |
| 2019/0263473 A1* | 8/2019 | Braedt | B62M 9/10 |
| 2019/0291818 A1* | 9/2019 | Braedt | B62K 25/02 |

FOREIGN PATENT DOCUMENTS

| | | |
|---|---|---|
| DE | 102006039333 A1 | 3/2007 |
| DE | 102012023819 A1 | 6/2013 |
| DE | 102014019528 A1 | 7/2015 |
| DE | 102015000715 A1 | 8/2015 |
| DE | 102015006582 A1 | 11/2015 |
| DE | 102015219522 A1 | 4/2016 |
| EP | 1764296 A1 | 3/2007 |
| EP | 2810864 A1 | 12/2014 |
| JP | 2000355295 A | 12/2000 |

\* cited by examiner

MULTI-PINION ARRANGEMENT AND BICYCLE DRIVE HAVING A MULTI-PINION ARRANGEMENT OF SAID TYPE

This application claims priority to, and/or the benefit of, German patent application DE 10 2016 015 433.0, filed on Dec. 23, 2016, the disclosure of which is included by reference herein in their entirety.

FIELD OF THE INVENTION

The invention relates to a sprocket, to a multi-sprocket arrangement for mounting on a rear-wheel hub having a sprocket of said type, and to a bicycle drive having a multi-sprocket arrangement of said type.

BACKGROUND

Document DE 10 2012 023 819 A1 describes a front chain wheel for attachment to a pedal crank of a bicycle, which chain wheel is distinguished by improved chain guidance in relation to conventional chain wheels. The improved guidance characteristics make it possible, when using a single such chain wheel on a pedal crank of a bicycle, to dispense with additional chain guides. The improved guidance characteristics are achieved in particular in that the chain wheel has, as viewed in an axial direction of the pedal crank, thick and thin teeth which are arranged alternately in a circumferential direction. Said chain wheels are unsuitable for use on a rear-wheel hub, because the exceptionally good chain guidance characteristics oppose a transfer to an adjacent sprocket.

Similar front chain wheel arrangements are known from US 2014/0338494 A1, DE 10 2014 019 528 A1, DE 10 2015 006 582 A1 and DE 10 2015 000 715 A1. All of said documents present front chain wheels with differently designed teeth, wherein said designs are focused in particular on stable chain guidance. Gearshift processes on multi-chain-wheel arrangements of a pedal crank and associated requirements differ significantly from those of a multi-sprocket arrangement for a rear-wheel hub of a bicycle. In the case of a driving chain wheel (on the pedal crank), the chain roller is received in each case by the load flank of the sprocket. The drive direction predefines that the gearshift process may be performed under load. In the case of an output sprocket, for example a sprocket of a multi-sprocket arrangement attached to a bicycle rear wheel, the chain rollers run in on or close to the run-in flank in the low load region. The chain guidance is realized the gearshift mechanism toothed wheel, such that the run-in situation onto the respective sprocket does not involve any significant skew. This gives rise to entirely different objectives for the gearshifting and for the guidance of the chain for a rear sprocket on the rear wheel of a bicycle and a front chain wheel on the pedal crank.

The number of sprockets on rear multi-sprocket arrangements has increased even further in recent years. Eleven or twelve sprockets in combination with one, two or three front chain wheels constitute common bicycle drives. Modern drives use even thirteen or fourteen sprockets, normally in combination with one or two front chain wheels. The increased number of sprockets however also gives rise to problems. Accordingly, with the increasing number of sprockets, the chain skew also increases, which has an adverse effect on the running characteristics and the efficiency of the bicycle drive. The chain skew is particularly intense if the chain is in engagement with the smallest sprockets or with the largest sprockets. The negative consequences of the particularly intense chain skew on the largest sprockets is counteracted in different ways. For example, measures are known which contribute to improved guidance of the chain and prevention of incorrect gearshifts.

One of these measures is known from DE 10 2015 219 522 A1. Said multi-sprocket arrangement has a sequence of thin and thick teeth. Here, the axial width of the thick teeth is dimensioned such that they can duly engage into the intermediate space of an outer link plate pair but not into the intermediate space of an inner link plate pair. The thin teeth can be placed in engagement both with an outer link plate pair and with an inner link plate pair. Such an arrangement improves the guidance behaviour of the chain without impairing the gearshift capability. A problem in the case of such known multi-sprocket arrangements is however the production process, which is expensive and time-consuming. Normally, such sprockets with thick and thin teeth are produced by cutting manufacturing processes, in particular milling or turning. That is to say, the starting material used has at least an axial width which corresponds to the axial width of the thick teeth. The thin teeth are then generated by material removal, for example by milling. This process is very material-consuming and time-consuming and is therefore also expensive.

EP 1 764 296 A1 has disclosed material deformations on sprockets of a multi-sprocket arrangement. Said arrangement however permits neither improved chain guidance nor reliable gearshifts. Other than in the gearshift channels, all of the teeth of the presented sprockets have a projection on the outer side or on the side facing toward the next-smaller sprocket. The tooth thickness of all teeth, both of the teeth with deformation and of the teeth without deformation, is in this case dimensioned such that they can engage both into the outer link plate pairs and into the inner link plate pairs. The clearance between the teeth, also the teeth with projection, and the outer link plates is correspondingly large and does not provide adequate guidance of the chain on the rear sprockets. Furthermore, almost all of the teeth are equipped with a projection which is formed on the outer side of the sprockets. The projections have a disruptive effect during gearshifts, because the chain can collide with the projections. Furthermore, such a large number of projections is cumbersome to manufacture.

A problem addressed is thus that of providing an inexpensive sprocket, which is easy to manufacture, for a rear multi-sprocket arrangement, which sprocket both permits reliable gearshifts and provides adequate guidance for the chain.

SUMMARY AND DESCRIPTION

In an embodiment, a multi-sprocket arrangement for rotatable mounting on a rear-wheel axle an engagement with a bicycle chain is provided. The bicycle chain has inner link plate pairs and chain outer link plate pairs. The multi-sprocket arrangement includes a sprocket having, between an axial inner side and an oppositely situated axial outer side, a flat sprocket body and a plurality of teeth formed on a circumference of the sprocket. The plurality of teeth include at least one tooth of a first tooth group, the axial width of which is dimensioned to be greater than a chain inner link plate spacing and smaller than a chain outer link plate spacing, and a second tooth group, the axial width of which are dimensioned to be smaller than the chain inner link plate spacing. When viewed in a circumferential direction, at least one sequence of three teeth is provided in which a tooth of the second tooth group, a tooth of the first tooth group and another tooth of the second tooth group are arranged directly in succession, and at least the one tooth of the first tooth group has a projection in an axial direction, which is produced by a material deformation.

In an embodiment, a bicycle drive includes a multi-sprocket arrangement for rotatable mounting on a rear-wheel axle an engagement with a bicycle chain having inner link plate pairs and chain outer link plate pairs. The multi-sprocket arrangement includes a sprocket having, between an axial inner side and an oppositely situated axial outer side, a flat sprocket body and a plurality of teeth formed on a circumference of the sprocket. The plurality of teeth include at least one tooth of a first tooth group, the axial width of which is dimensioned to be greater than a chain inner link plate spacing and smaller than a chain outer link plate spacing, and a second tooth group, the axial width of which are dimensioned to be smaller than the chain inner link plate spacing. When viewed in a circumferential direction, at least one sequence of three teeth is provided in which a tooth of the second tooth group, a tooth of the first tooth group and another tooth of the second tooth group are arranged directly in succession, and at least the one tooth of the first tooth group has a projection in an axial direction, which is produced by a material deformation. The bicycle drive also includes a rear gear shift mechanism, exactly one front chain ring arrangement with at least one chain ring 3, and a bicycle chain configured to engage with the chain ring and with the sprocket of the multi-sprocket arrangement.

In an embodiment, a sprocket for use in a multi-sprocket assembly attachable to a rear wheel of a bicycle is provided. The sprocket includes a flat sprocket body, the sprocket body comprising an attachment portion configured for attachment to at least one other sprocket of the multi-sprocket assembly, and a plurality of teeth formed on a circumference of the sprocket body. The plurality of teeth including at least one tooth of a first tooth group, the axial width of which is dimensioned to be greater than a chain inner link plate spacing and smaller than a chain outer link plate spacing, and a second tooth group, the axial width of which are dimensioned to be smaller than the chain inner link plate spacing. When viewed in a circumferential direction, at least one sequence of three teeth is provided in which a tooth of the second tooth group, a tooth of the first tooth group and another tooth of the second tooth group are arranged directly in succession, and at least the one tooth of the first tooth group has a projection in an axial direction, which is produced by a material deformation.

BRIEF DESCRIPTION OF THE DRAWINGS

The present invention is explained in greater detail below with reference to the appended drawings, in which.

DETAILED DESCRIPTION OF THE DRAWING

Figure 1:
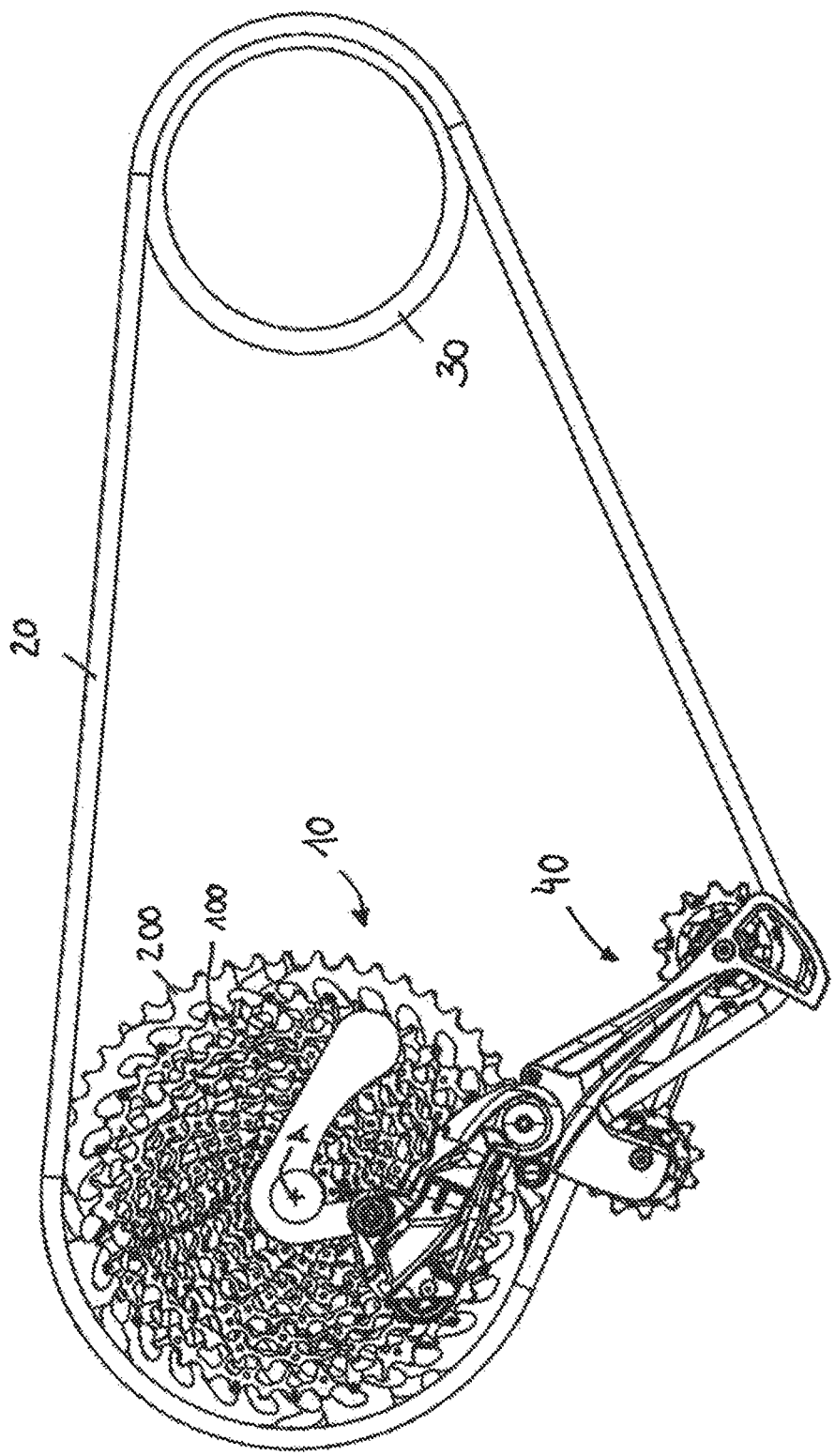
FIG. 1 shows a schematic illustration of a bicycle including a bicycle drive.

A sprocket for a multi-sprocket arrangement for rotatable mounting on a rear-wheel axle and for engaging with a bicycle chain is provided. The bicycle chain comprises chain inner link plate pairs and chain outer link plate pairs. The sprocket has, between an axial inner side and an oppositely situated axial outer side, a flat sprocket body. A plurality of teeth is formed on a circumference of the sprocket. The plurality of teeth comprises at least one tooth of a first tooth group, the axial width of which is dimensioned to be greater than a chain inner link plate spacing and smaller than a chain outer link plate spacing. The plurality of teeth furthermore comprises teeth of a second tooth group, the axial width of which is dimensioned to be smaller than the chain inner link plate spacing; wherein, viewed in a circumferential direction, at least one sequence of three teeth is provided in which a tooth of the second tooth group, a tooth of the first tooth group and another tooth of the second tooth group are arranged directly in succession; wherein the at least one tooth of the first tooth group has a projection in an axial direction, which is produced by a material deformation.

The axial inner side of the sprocket corresponds in this case to the side which, in the assembled state of the multi-sprocket arrangement, points in the direction of the next-larger sprocket. The outer side of the sprocket correspondingly points in the direction of the next-smaller sprocket.

The sequence of a thin tooth, a thick tooth and a thin tooth has a positive effect on the chain guidance, because the thick teeth fill the gap between the outer link plates of the chain to a greater extent than the normal thin teeth. The chain thus has less freedom of movement relative to the sprocket. This sequence may repeat itself several times along the circumference of a sprocket.

Owing to the production of the projection by material deformation, the sprocket can be manufactured inexpensively and quickly. All projections can be produced in one working step, for example by stamping, and do not need to be individually milled in succession.

In an embodiment, the sprocket body has an axial width B3 which substantially corresponds to the axial width B2 of the teeth of the second tooth group. The axial width B3 of the sprocket body is thus smaller than the axial width B1 of the at least one tooth of the first tooth group.

Use can advantageously be made of a thin and lightweight starting material.

In one exemplary embodiment, the axial width B1 of the tooth of the first tooth group amounts to 65-85%, in particular 68%, of the chain outer link plate spacing D1, and the axial width B2 of the tooth of the second tooth group amounts to 65-85%, in particular 79%, of the chain inner link plate spacing D2. In relation to the prior art, where all teeth are of approximately equal width and are coordinated with the chain inner link plate spacing, the filling degree of a thin tooth (in this case 1.7 mm) in relation to the chain outer link plate spacing D1 amounted to only 47%. By contrast, the filling degree of 68% of the thick teeth by the sprocket constitutes an improvement in relation to the prior art.

The axial width B1 of the tooth of the first tooth group is in this case dimensioned to be larger by 40-50%, in particular 47%, than the axial width B2 of the teeth of the second tooth group.

In an embodiment, the projection is formed on the inner side of the sprocket. More specifically, the projection is formed on the inner side of the tooth of the first tooth group. Here, the inner side corresponds to that side of the sprocket which, in the assembled state of the multi-sprocket arrangement, points in the direction of the next-larger sprocket.

The outer side, situated opposite the inner side, of the sprocket or of the teeth is free from projections. That is to say, the projections are situated only on one axial side of the sprocket. This has the advantage that the outer side can be utilized for gearshift channels, and the chain does not collide with the projections on the inner side during gearshifts.

In an embodiment, the projection extends in a radial direction from the tooth tip of the thick tooth to the tooth root of the thick tooth.

In an embodiment, the projection extends in a radial direction as far as, but not beyond, the root circle diameter.

In an embodiment, the projection has a bevel on its radially outer end. The bevel of the projection extends in a radial direction as far as the tooth tip and transitions into an inner bevel, likewise arranged on the inner side, of the tooth tip. Both bevels have the same bevel angle and thus form a continuous plane.

The projection may have a polygonal, for example rectangular, shape as viewed from the side. This shape can be produced easily by material deformation. Furthermore, a rectangular shape provides a sufficient guide surface for the chain.

In an embodiment, the projection has a U-shaped or V-shaped cross section as viewed in a section plane orthogonal to a radial line. Said cross-sectional shape arises as a result of the stamped indentation on one side (outer side) and the resulting projection on the opposite side (inner side). The U-shaped cross section in particular offers a good guide surface.

In an embodiment, the sprocket has, on the inner side, in each case one recess for receiving a chain inner link plate in the region of the teeth of the second tooth group. The recess has a small axial width B5 and may be produced by stamping.

In an embodiment, a gearshift channel in the form of a depression is arranged on the outer side of the sprocket. In particular, multiple depressions of different depth can form a gearshift channel. The depressions are produced in particular by stamping.

In an embodiment, the projection is realized by material deformation from the outer side towards the inner side. In an embodiment, this yields a stamped indentation on the outer side and the projection on the inner side.

Alternatively, the material deformation may also be realized from the inner side. Here, material on the inner side of the sprocket is laterally displaced by impression. This leads in particular to two lateral projections adjacent to the stamping point.

In an embodiment, the sprocket has an even number of teeth.

In an embodiment, the fraction of thick teeth in the total number of teeth of the sprocket amounts to less than 50%. In an embodiment, the fraction of thick teeth in the total number of teeth of the sprocket amounts to less than 40%. For example, the fraction of thick teeth in the total number of teeth of the sprocket amounts to between 37.5% and 25%.

For example, on a sprocket with 42 teeth, 15 teeth have a projection that has been produced by material deformation. In the case of a sprocket with a total of 48 teeth, 16 teeth may be equipped with a projection generated by material deformation. In the case of a sprocket with 50 teeth, it is the case in particular that 18 teeth have projections by material deformation.

In an embodiment a multi-sprocket arrangement for mounting on a rear-wheel axle with at least one sprocket as described herein is provided.

In an embodiment, the at least one sprocket is one of the large sprockets of the multi-sprocket arrangement. In particular, the largest and/or second-largest sprocket of the plurality of sprockets is designed correspondingly to the sprocket.

At least one further sprocket of the multi-sprocket arrangement is free from projections and thus differs from the sprocket. The at least one further sprocket preferably has an odd number of teeth. For example, the multi-sprocket arrangement has exactly twelve sprockets. Of the twelve sprockets, the largest and/or second-largest sprocket corresponds to the sprocket. The other ten, relatively small sprockets correspond to the further sprockets, which are free from projections.

In an embodiment, the at least one sprocket is formed as a single sprocket.

Single sprockets refer to separately manufactured sprockets which are firstly manufactured and which are positioned relative to one another in a subsequent assembly process. In general, such single sprockets are produced by punching. These are distinguished from multi-sprocket arrangements produced in one piece, which are normally milled and are therefore expensive and complicated to manufacture. In an embodiment, all sprockets of the multi-sprocket arrangement are formed as separate single sprockets.

In an embodiment, the single sprockets do not extend as far as the driver in a radial direction. A torque is transmitted to a driver not directly but indirectly. An indirect transmission of torque is possible using a carrier, or spider. Another possibility is the discharge of the torque via the adjacent sprocket to a single sprocket connected in torque-transmitting fashion to the driver; this is normally the largest sprocket. In this way, the sprocket bodies of those sprockets which do not transmit a torque can be of ring-shaped form, and weight can be saved.

In an embodiment, the single sprocket is connected to an adjacent sprocket by an axially extending connecting member. Said connecting member are in particular pins.

The single sprocket has radially outer pin openings for connection to a next-larger sprocket. Furthermore, the single sprocket has radially inner pin openings for connection to a next-smaller sprocket. The radially outer pin openings and the radially inner pin openings are spaced apart from the root circle diameter of the single sprocket and are arranged further to the inside.

In an embodiment, all sprockets of the multi-sprocket arrangement are formed as separately manufactured single sprockets and connected to pins. The single sprockets have in each case a radially outer hole circle with outer pin openings and a radially inner hole circle with inner pin openings. The outer pin openings of a single sprocket are coordinated with the inner pin openings of the next-larger sprocket. The inner pin openings of the single sprocket are correspondingly coordinated with the outer pin openings of the next-smaller sprocket. Respectively adjacent sprockets are in this way connected to one another by pins pressed into the pin openings. A torque transmitted from the chain to a sprocket is transmitted via the pin connectors from one to the next sprocket and finally to the driver via a sprocket connected in torque-transmitting fashion to the driver. Such a multi-sprocket arrangement can be manufactured particularly inexpensively and is particularly lightweight.

In an embodiment, a bicycle drive having a multi-sprocket arrangement, having a rear gearshift mechanism, having a front chain ring arrangement with at least one chain ring, for example exactly one front chain ring, and having a bicycle chain, is provided. The bicycle chain can be placed in engagement with the chain ring and with a sprocket of the multi-sprocket arrangement.

As an alternative to the material deformation, the projections could also be produced by material application. A material that can be easily connected to the base material, for example plastic, can be applied to the desired locations. For this purpose, either the material can be applied on one side to the teeth of the first group, or said teeth may be encapsulated by injection molding. For increased strength, it is possible in particular for composite openings to be provided on the first group of teeth, through which a liquefied material is injection molded.

It would also be possible for the teeth of the first tooth group to assume an oblique position relative to the teeth of the second tooth group in a circumferential direction, such that the resulting axial width thereof is increased depending on the oblique positioning. The actual axial width of the teeth duly still corresponds to the thickness of the raw material of the sprocket, but the oblique positioning increases the engagement width into the space of the chain link plate pairs. For example, a rotation of the tooth through 90 degrees relative to the normal position would lead to a maximum oblique position and maximum resulting width in an axial direction. The tooth length in the circumferential direction then corresponds to the resulting axial width. A rotation of the tooth through less than 90 degrees would be preferred for strength purposes.

A combination of projections manufactured by material deformation, oblique positioning or material application would also be conceivable.

FIG. 1 shows a schematic illustration of a bicycle drive. The front chain wheel arrangement comprises a single chain wheel 30. In the illustrated embodiment the multi-sprocket arrangement 10 comprises twelve sprockets with a largest sprocket 200 and with a second-largest sprocket 100. The chain wheel 30 is oriented in relation to the multi-sprocket arrangement 10 such that a neutral chain line is assumed when the chain 20 is in engagement with one of the central sprockets. The neutral chain line corresponds approximately to the ideal profile of the chain, in the case of which virtually no chain skew occurs. On the smallest and largest sprockets, the chain skew is correspondingly at its greatest. In the state shown, the bicycle chain 20 is in engagement with the teeth of the chain wheel 30 and with the teeth of the largest sprocket 200 of the multi-sprocket arrangement 10. The bicycle chain 20 transmits a force from the front chain wheel 30 to the rear multi-sprocket arrangement 10 and from there via a driver to the rear-wheel hub. The gearshift mechanism 40 moves the bicycle chain 20 during gearshift processes from one sprocket to an adjacent sprocket. The gearshift mechanism may in this case be either mechanically or electrically operated. In the exemplary embodiment shown, which has only one chain wheel 30, the front derailleur is omitted. In embodiments with multiple chain wheels, the front derailleur may also be electrically operated, in particular wirelessly.

Figure 2:
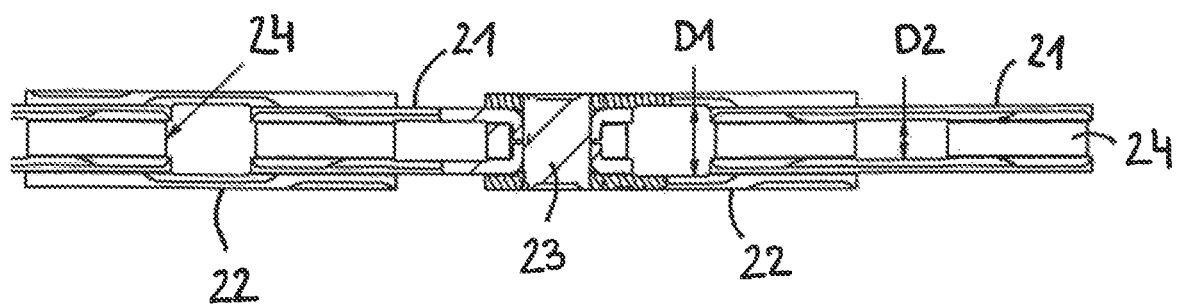
FIG. 2 shows a partial section through a chain.

FIG. 2 shows a plan view of a partial section through a bicycle chain 20. The chain 20 is normally composed of chain inner link plates 21 and chain outer link plates 22. In each case two opposite inner link plates 21 and outer link plates 22 respectively form an inner and an outer link plate pair. The inner link plates 21 and the outer link plates 22 are articulately connected in an alternating manner by chain pins 23. The chain pin 23 is riveted to the outer link plate 22, which is visible in the sectioned region of the illustration. On the collars of the inner link plates 21 there are rotatably mounted chain rollers 24, which are also visible in the partial section. The chain inner link plates 21 of a chain inner link plate pair are arranged with an axial spacing D2 to one another. The chain outer link plates 22 of a chain outer link plate pair are arranged with an axial spacing D1 to one another. Here, the spacing D1 between the chain outer link plates 22 is greater than the spacing D2 between the chain inner link plates 21. Said spacings D1 and D2 define the engagement space for the teeth of the multi-sprocket arrangement. In the exemplary embodiment shown, the spacing D2 is dimensioned so as to be 2.16 mm, and the spacing D1 is dimensioned so as to be 3.65 mm. To permit a clean engagement into the chain 20, the axial widths of the teeth of the multi-sprocket arrangement must be coordinated with the spacings D1 and D2. The axial width of the teeth will be discussed in more detail in conjunction with FIGS. 7 to 10.

Figure 3A:
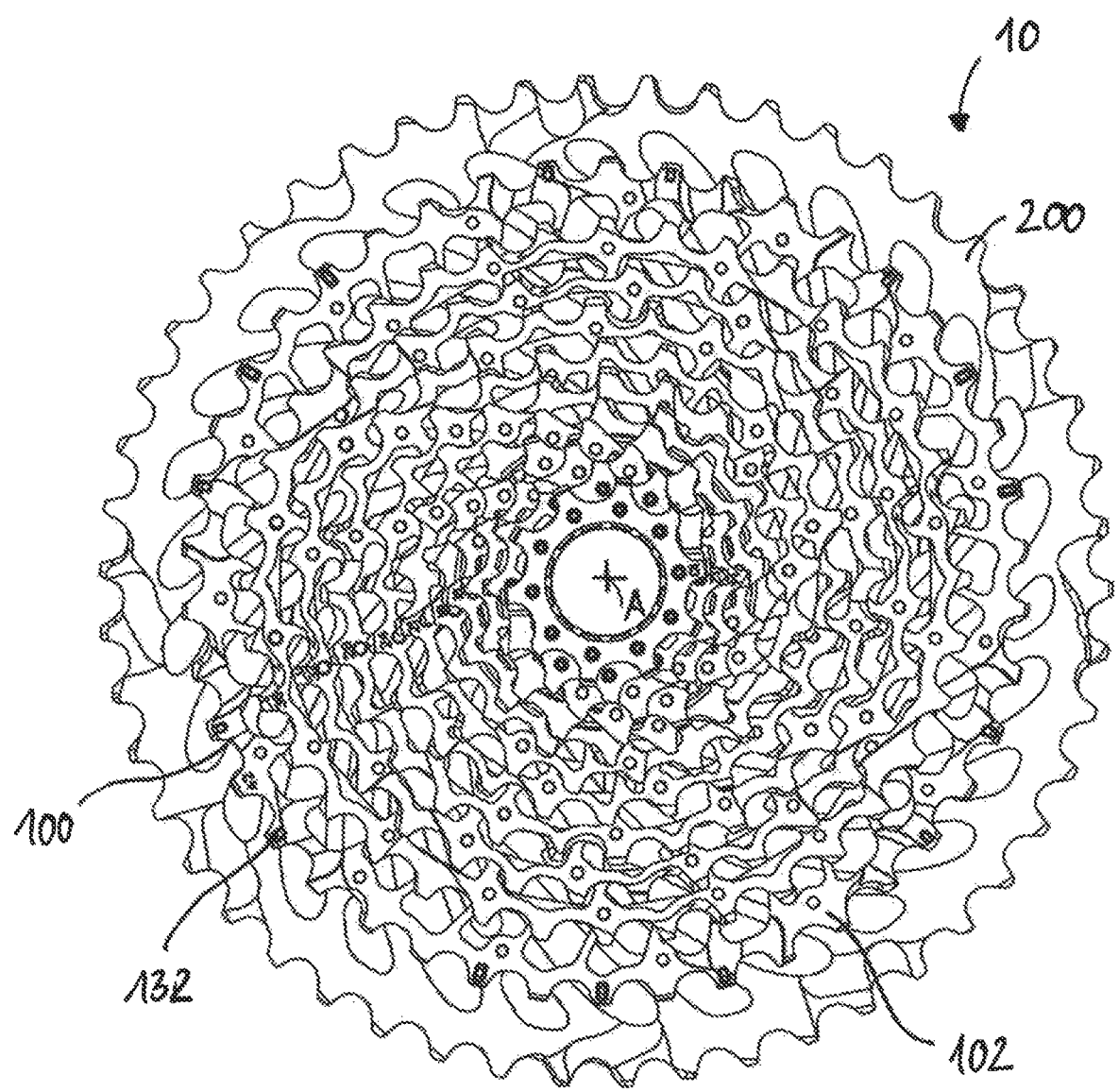
FIG. 3A shows an outside view of a multi-sprocket arrangement.

FIG. 3A shows an outside view of the first embodiment of the multi-sprocket arrangement 10. The multi-sprocket arrangement 10 which is shown has twelve sprockets. The 50 teeth of the largest sprocket 200 may be produced in a conventional manner, such as by milling or other material removal techniques. Other techniques, such as material deformation may also be used. Said largest sprocket likewise has teeth 211 of axially relatively large width and teeth 212 of relatively small width. The second-largest sprocket 100 is a sprocket 100 with 42 teeth, wherein the teeth of the first tooth group 111 have a projection 130 that has been generated by stamping. 15 teeth of the total of 42 teeth of the sprocket 100 have a stamped indentation 132 on the outer side 102 and a projection 130 on the inner side 101. The remaining ten, relatively small sprockets have no projections, and their teeth are of substantially equal width.

Figure 3B:
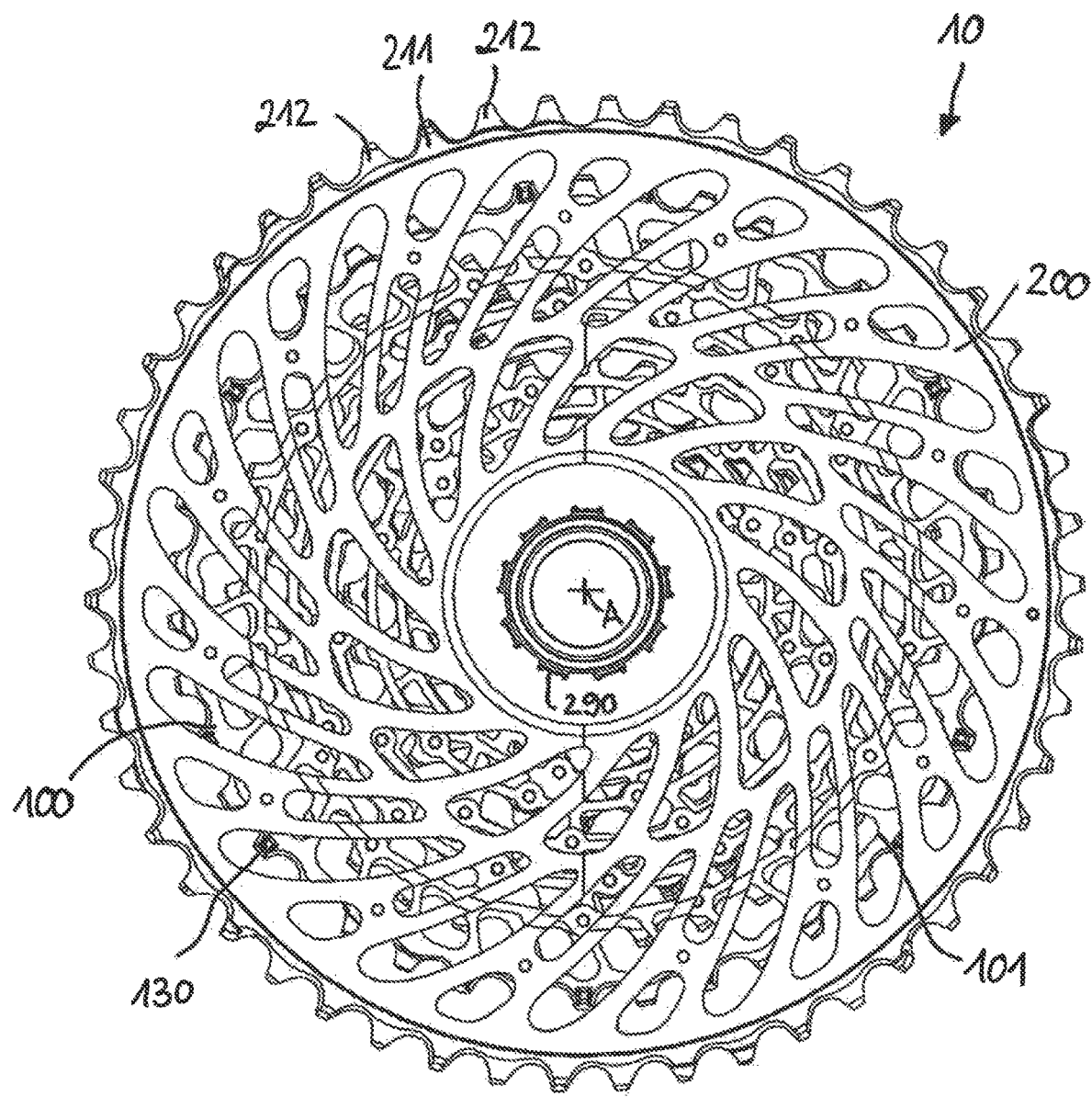
FIG. 3B shows an inside view of the multi-sprocket arrangement of FIG. 3A.

FIG. 3b shows an inside view of the multi-sprocket arrangement 10 from FIG. 3A. Here, the largest sprocket 200 can be seen particularly clearly, which likewise has thick teeth 211 and thin teeth 212 on the inner side. As is known from the prior art, the thin teeth 212 are produced by milling from recesses. Here, the thick teeth 211 and the sprocket body correspond approximately to the material thickness of the starting material. To save weight, the largest sprocket 200 is preferably manufactured from aluminum. The sprocket 200 has, on its radially inner circumference, a profile 290 for engaging into a corresponding counterpart profile on the driver and for the transmission of torque to the latter.

To further reduce weight and costs, it would also be possible for the largest sprocket to be manufactured in accordance with the design of the sprocket 100. That is to say, the sprocket body of the largest sprocket would correspond to the material thickness of the starting material and to the axial width of the thin teeth. The thick teeth would be produced by material deformation. As a result of the saving of material and thus also weight, it would then be possible for the largest sprocket to be manufactured from relatively cheap steel.

Figure 4:
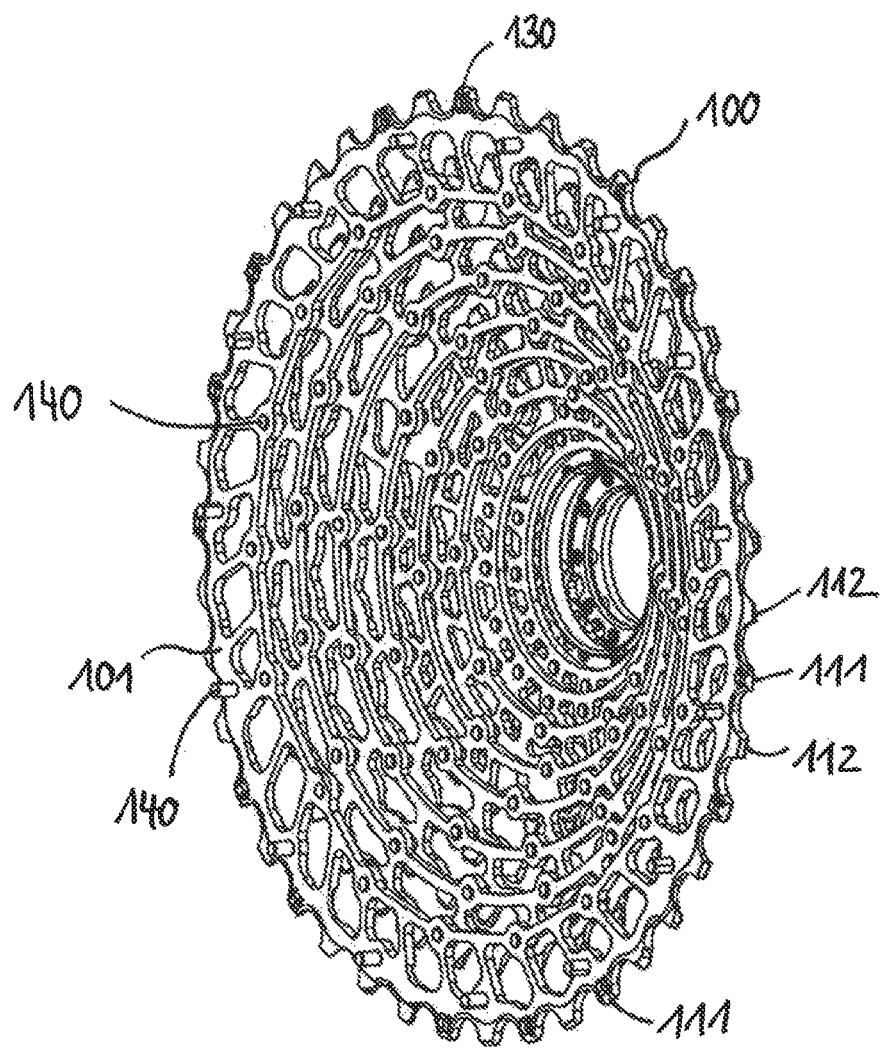
FIG. 4 shows a perspective inside view of the multi-sprocket arrangement from FIG. 3A-3B without the largest sprocket.

FIG. 4 shows a perspective inside view of the first embodiment of the multi-sprocket arrangement 10 without the largest sprocket 200. Here, the conical structure of the arrangement 10 can be seen. The twelve sprockets of the multi-sprocket arrangement 10 are separately manufactured single sprockets, which are connected by pins 140. For this purpose, all of the sprockets have pin openings into which the pins 140 are pressed. Each sprocket (aside from the largest and the smallest sprocket) comprises a radially outer hole circle with outer holes 104 and a radially inner hole circle with inner holes 105. Each sprocket is connected in each case to the adjacent next-smaller sprocket by the inner hole circle and to the adjacent next-larger sprocket by the outer hole circle. For example, the sprocket 100 is connected by its outer hole circle to the next-larger sprocket 200 and by its inner hole circle to the next-smaller sprocket. The largest sprocket 200 has only an inner hole circle, because it is connected only to the next-smaller sprocket 100. Correspondingly, the smallest sprocket has only an outer hole circle, because it is connected only to the next-larger sprocket. The number of holes per hole circle varies. However, a uniform distribution of the holes over the hole circle is sought. For example, the sprocket 100 has an outer hole circle with 15 uniformly distributed holes 104 and an inner hole circle with 18 uniformly distributed holes 105 (in this regard, cf. FIGS. 5a and 5b).

The illustrated plug-type connection composed of pins 140 permits an indirect transmission of the torque from the sprocket which is in engagement with the chain to the driver via the largest sprocket 200. That is to say, the other sprocket bodies can be of very narrow and ring-shaped form, and do not need to extend as far as the driver.

Figure 5A:
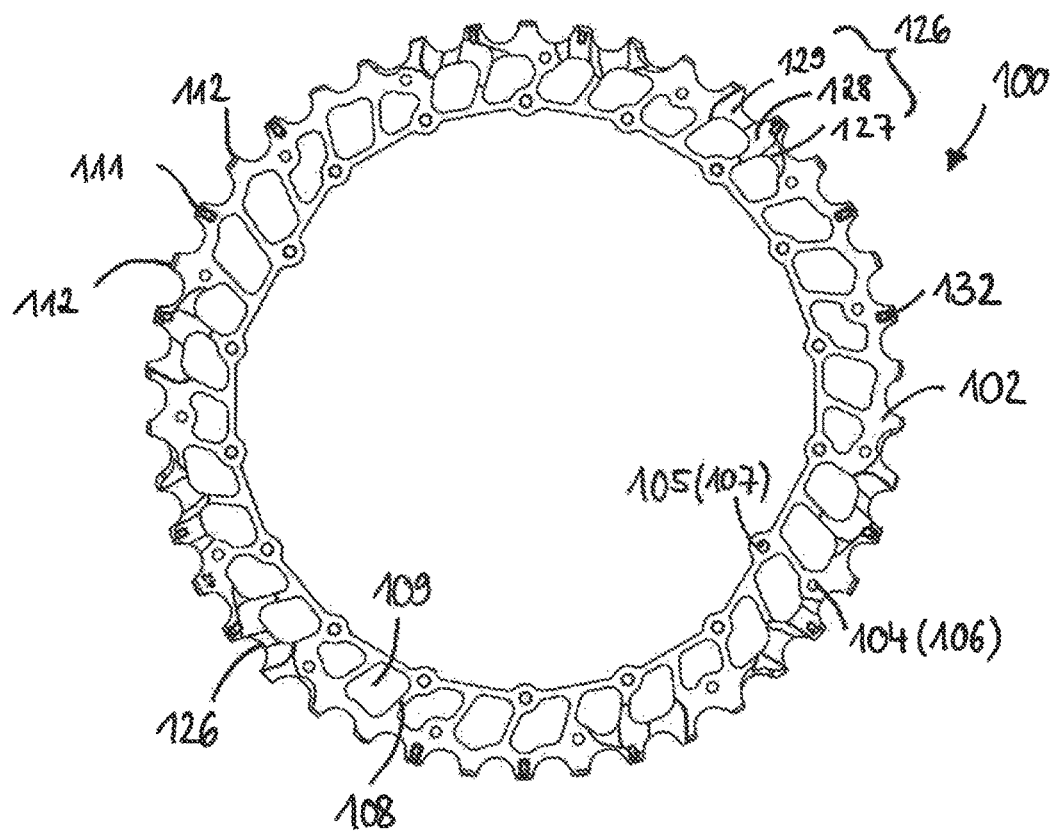
FIG. 5A shows an outside view of a sprocket.

FIG. 5A shows the outer side 102 of the sprocket 100. The projections 130 duly point toward the inner side 101, but the stamped indentations 132 of the projections 130 can also be clearly seen here. The gearshift channels 126 are arranged on the outer side 102 of the chain wheel 100. The gearshift channels 126 have multiple depressions 127, 128, 129 of different depth. In particular, a gearshift channel 126 is composed of a first depression 127 with a first depth, of a second depression 128 with a second depth, and of a third depression 129 with a third depth, wherein the third depression 129 is formed so as to be deeper than the second depression 128, and the second depression 128 is formed so as to be deeper than the first depression 127. To reduce the forces required for the material deformation, gearshift channels may be manufactured from multiple depressions of different depths. The depth of the depressions is adapted to the oblique profile of the chain during the transfer between two adjacent sprockets. Since the projections 130 point toward the opposite, inner side 101, they may also be arranged in the region of the gearshift channels 126 without posing an obstruction.

Figure 5B:
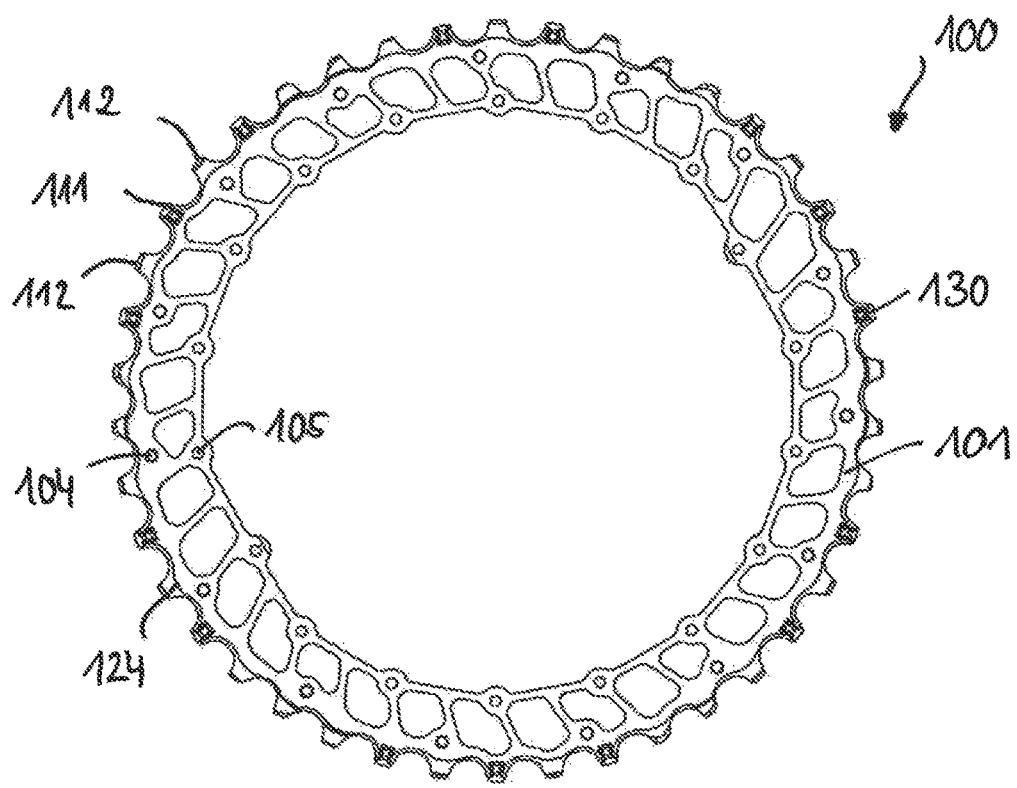
FIG. 5B shows an inside view of the sprocket of FIG. 5A.

FIG. 5B shows the inner side 101 of the sprocket 100. Both the projections 130 of the thick teeth 111 and the recesses 124 in the region of the thin teeth 112 are arranged on this side. The recesses 124 are optional, and have a contour which corresponds to the contour of the waisted chain link plates. The recess 124 creates additional space for the inner link plates 21 and thus facilitates the gearshift process.

The separate arrangement of projections 130 on the axial inner side 101 and of gearshift channels 126 on the axial outer side 102 permits the arrangement in the same circumferential regions. The guide characteristics of the projections 130 on the inner side 101 of the sprocket 100 come to bear for as long as the chain 20 is in engagement with the teeth. When the chain 20 is moved out of engagement with the teeth during gearshifts, it can slide along the axial outer side 102 of the sprocket 100 without colliding with the projections 130. The depressions of the gearshift channels 126 on the outer side 102 provide sufficient axial space for the chain 20 during gearshifts.

It would optionally be possible for the teeth of the first tooth group to not only have a greater axial width than the teeth of the second tooth group but to also be formed so as to be taller in a radial direction than the teeth of the second tooth group.

The sprocket 100 is of ring-shaped form and has a plurality of material apertures 109, which leads to web-like connectors 108 between the outer and inner hole circles.

The 15 outer pin holes 104 are arranged outside the depressions of the gearshift channels 126 so as not to further weaken the already relatively thin material. Furthermore, the pin holes 104 are arranged radially further to the inside than the root circle diameter 117. The outer hole circle diameter is thus smaller than the root circle diameter 117.

Figure 6:
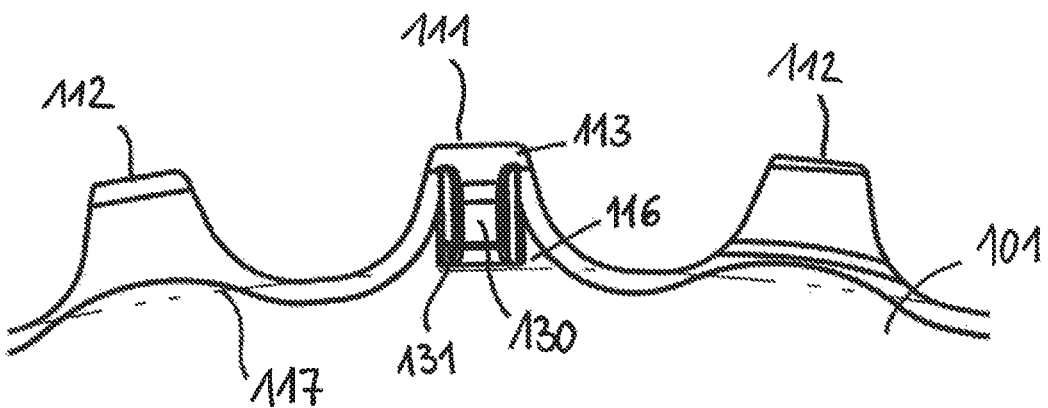
FIG. 6 shows an enlarged illustration of a tooth sequence of the sprocket from FIG. 5B.

FIG. 6 shows an enlarged illustration of a sequence of three teeth of the sprocket 100 illustrated in FIG. 5B. Here, in a circumferential direction, a thin tooth 112 is followed directly by a thick tooth 111, which is followed in turn by a thin tooth 112. In other words, a thin tooth 112 is arranged in front of and behind every thick tooth 111. This sequence is necessary in order to ensure the correct engagement of the chain 20. Since the axial width B1 of the thick teeth 111 is dimensioned such that it can engage into an outer link plate pair 22 but not into an inner link plate pair 21, the chain 20 is aligned correspondingly. The thick tooth 111 can protrude fully only into a pair of outer link plates 22. Since the outer and inner link plates 22, 21 of the chain are always arranged alternately, a tooth of the second tooth group 112 must be arranged upstream and downstream of the thick tooth 111 in order to ensure a smooth engagement of the chain. By contrast, the thin teeth 112 can engage both into pairs of inner link plates and into pairs of outer link plates, and do not lead to a constrained sequence or alignment.

Furthermore, in the enlarged illustration of the inner side 101, it can be clearly seen that the projection 130 extends from the tooth tip 113 to the tooth root 116. The projection 130 however does not extend beyond the root circle diameter 117. The waisted outer link plates (not shown here) of the chain that is in engagement with the thick teeth 111 do not pass beyond the root circle diameter 117. Therefore, no interaction between chain and projection 130 can occur, such that an extent beyond the root circle diameter 117 is not necessary. The projections 130 can be kept small. The rectangular shape of the projections 130 and the length L4 nevertheless offer sufficient surface area for ensuring adequate guidance of the chain outer link plates 22.

Furthermore, a projection 130 which does not protrude beyond the root circle diameter 117 offers the advantage that the deformed, or punched, sprockets 100 can be stacked in a manner slightly rotationally offset with respect to one another. This facilitates handling during production and transportation.

Figure 7:
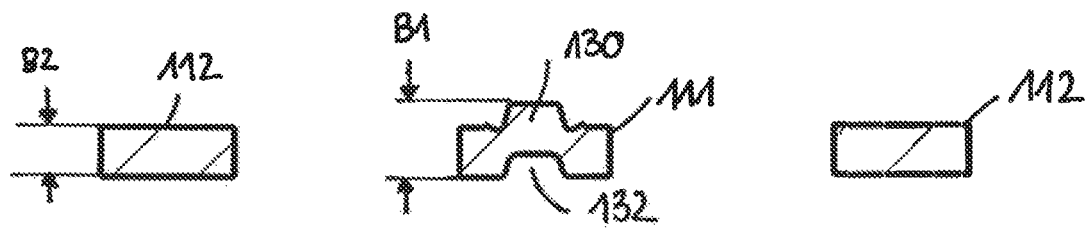
FIG. 7 shows a schematic cross-sectional view of the tooth sequence from FIG. 6.

FIG. 7 shows the sequence of teeth from FIG. 6 in a schematic cross section. Here, the different axial widths of the thick teeth 111 and thin teeth 112 are particularly clear. The axial width B1 of the thick teeth 111 is considerably greater than the axial width B2 of the two adjacent thin teeth 112. Here, the width B2 of the thin teeth 112 corresponds approximately to the width of the starting material. The projection 130 formed on the inner side 101 as a result of the material displacement leads to the enlarged width B1. The stamped indentation 132 can be seen on the outer side 102.

In the embodiment shown, the axial width B1 of the thick teeth 111 corresponds to approximately 2.5 mm, and the axial width B2 of the thin teeth 112 corresponds to approximately 1.7 mm. Thus, the difference between an adjacent thick and thin tooth 111, 112 is 0.8 mm. This difference however exists only on the axial inner side, on which the projection 130 is formed. The axial width B4 of the projection 130 results from the difference between the inner link plate spacing D2 and the outer link plate spacing D1, which in this case is approximately 1.6 mm. Since the projection 130 is formed only on one side, said difference is divided by two, which leads to a projection with a width of 0.8 mm. The unilateral arrangement of the projection 130 on the inner side 101 ensures adequate chain guidance without adversely affecting the gearshift behavior.

The dimensions of the chain 20 specified in conjunction with FIG. 2 and FIG. 7, in particular the axial spacings D1, D2 and the axial widths B1 and B2 of the teeth 111, 112, lead to a certain filling degree of the teeth that engage into the chain. The teeth of the first tooth group 111 with the axial width B1 fill approximately 65% to 85% of the corresponding axial spacing D1 of the outer link plate pairs 22. In the embodiment shown, the filling degree of the tooth of the first tooth group 111 which engages into an outer link plate pair 22 is 68%. The teeth of the second tooth group 112 with the axial width B1 likewise fill approximately 65% to 85% of the corresponding axial spacing D2 of the inner link plate pairs 21. In the embodiment shown, the filling degree of the tooth of the second tooth group 112 which engages into an inner link plate pair 21 is approximately 79%.

Figure 8:
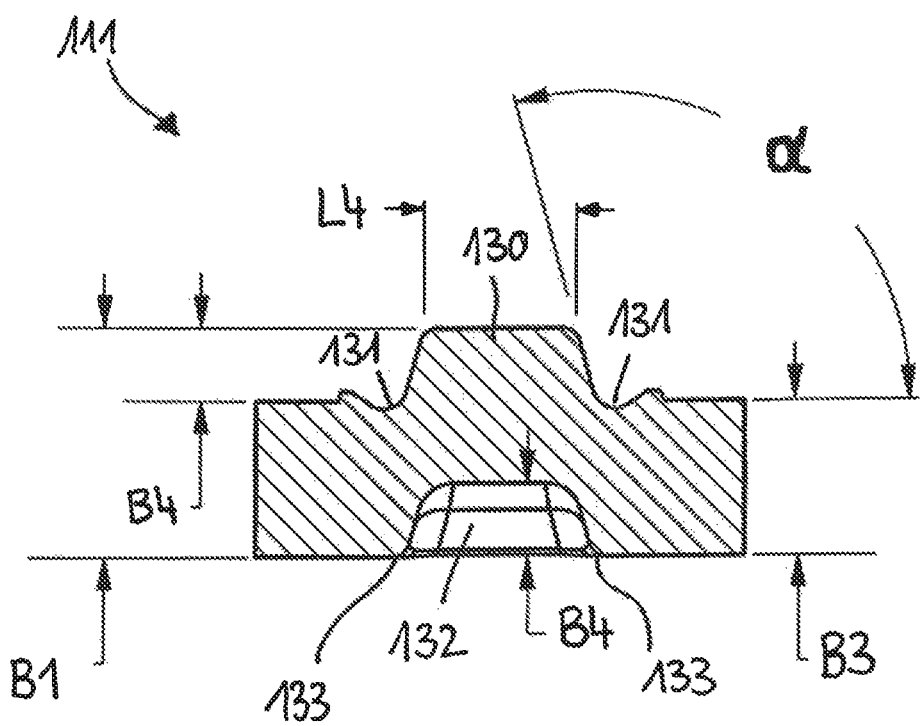
FIG. 8 shows an enlarged illustration of a cross section through a tooth of the first tooth group.

FIG. 8 shows an enlarged cross section through a thick tooth 111. The section runs orthogonally with respect to the radial line. The thick tooth 111 has a projection 130 on one axial side, specifically on the inner side 101 of the tooth 111. The projection 130 is generated by material deformation, for example stamping. For this purpose, a stamping tool is pressed against the sprocket 100 from the outer side 102 in the direction of the inner side 101. In the process, the material is deformed or displaced in an axial direction from the outer side toward the inner side. In this exemplary embodiment, the material is deformed such that the projection 130 has an axial width B4 of 0.8 mm. Here, the depth of the stamped indentation 132 on the outer side 102 corresponds approximately to the axial width B4 of the projection 130 on the inner side 101. That is to say, the stamped indentation 132 on the outer side 102 is approximately 0.8 mm deep, and leads to a projection 130 which likewise measures approximately 0.8 mm. To ensure particularly accurate formation of the projection 130, the stamped indentation 132 could be dimensioned to be slightly deeper than the width B4 of the resulting projection 130. A slightly deeper stamped indentation 132 ensures that sufficient material is available for forming the projection 130. The illustrated projection 130 which is of U-shaped or V-shaped form in cross section can be stamped and demolded particularly easily. The length L4 of the projection 130 is coordinated with the length of the link plate intermediate spaces, and must be dimensioned to be smaller than these. The projection 130 that is shown has in particular a length L4 of approximately 1.7 millimeters ("mm"). The sides of the projection 130 have an oblique profile and are in particular at an angle α of 105° with respect to the surface of the sprocket. The length and the oblique angles of the stamped indentation 132 likewise correspond approximately to those of the projection 130. The grooves 131 which run on the inner side 101 laterally adjacent to the projection 130 likewise assist the stamping capability and ensure that the edges 133, formed on the outer side 102, of the stamped indentation 132 are demolded cleanly.

The axial overall width B1 of the thick tooth 111 is formed from the sum of the axial width B3 of the sprocket body 120 and of the axial width B4 of the projection 130. To save material, the axial width B3 of the sprocket body 120 preferably corresponds to the axial width of the starting/raw material. In the exemplary embodiment shown, the axial width B1 is dimensioned to be 2.5 mm, the width B3 of the raw material is dimensioned to be 1.8 mm, and the axial width B4 of the projection 130 is dimensioned to be 0.8 mm. All dimensional specifications are subject to the normal manufacturing tolerances.

Figure 9:
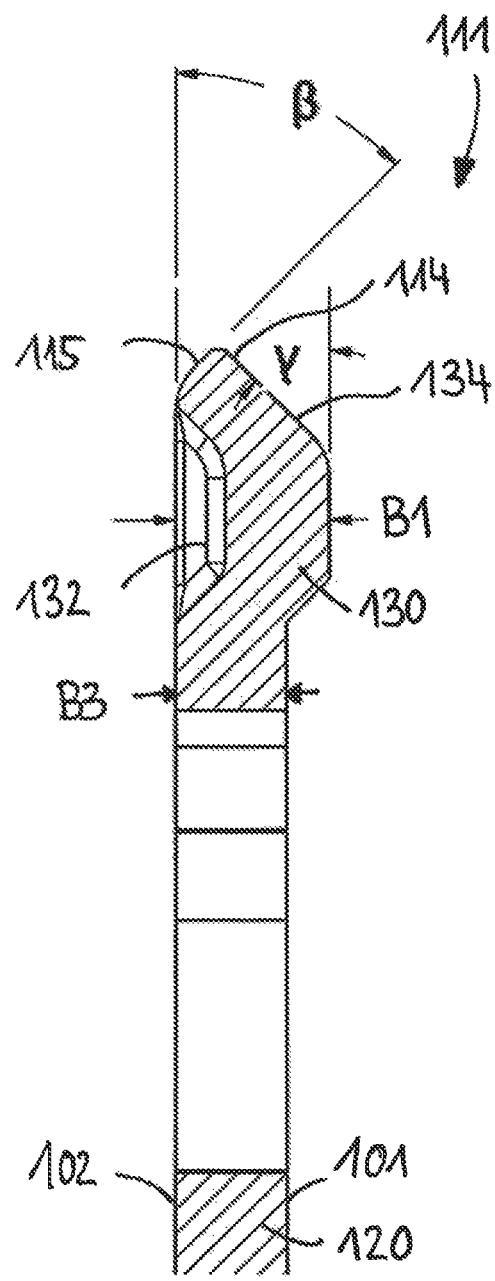
FIG. 9 shows an enlarged illustration of a longitudinal section through a tooth of the first tooth group.

FIG. 9 shows a longitudinal section through the thick tooth 111. Again, the stamped indentation 132 on the outer side 102 and the corresponding projection 130 on the inner side 101 can be clearly seen. Also, the axial width B1 of the thick tooth 111 differs considerably from the axial width B1 of the rest of the sprocket body 120. In this illustration, the outer bevel 115 and the inner bevel 114 on the tooth tip of the thick tooth 111 are visible. The outer bevel 115 of the thick tooth 111 is in this case dimensioned with an angle β of 45°. The inner bevel 114 on the tooth tip transitions into the bevel 134 on the projection 130—both bevels 114 and 134 have an angle γ of 45°. A bevel 114, 134 running in continuous fashion from the tooth tip to the thickest point of the tooth 111 ensures that the tooth 111 slides into the outer link plate 22 as quickly as possible, and the optimum guidance position is reached quickly.

Figure 10:
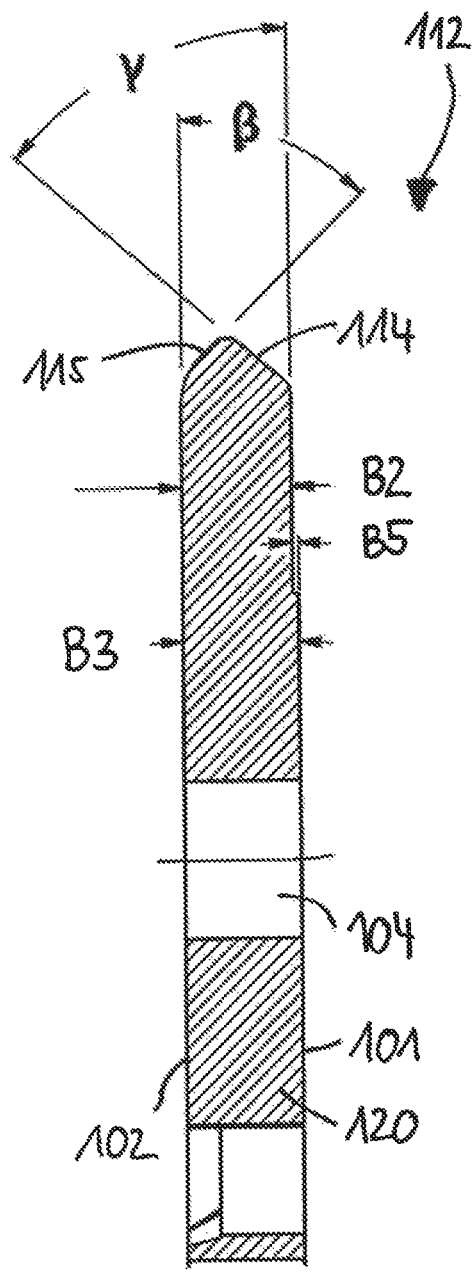
FIG. 10 shows an enlarged illustration of a longitudinal section through a tooth of the second tooth group.

FIG. 10, shows a longitudinal section through the thin tooth 112. The axial width B2 of the thin tooth 112 corresponds substantially to the width B3 of the sprocket body 120, that is to say to the starting material. In the embodiment shown, the thin tooth 112 has a recess 124, the contour of which is adapted to the shape of the chain link plates. The recess 124 has an axial width B5 with a dimension of 0.1 mm. In this case, the axial width B2 (1.7 mm) of the thin tooth 112 is thus smaller by 0.1 mm than the axial width B3 (1.8 mm) of the sprocket body 120. The thin tooth 112 also has an outer bevel 115 and an inner bevel 114 on the tooth tip. The outer bevel 115 on the thin tooth 112 is in this case dimensioned with an angle β of likewise 45°. By contrast, the inner bevel 114 of the thin tooth 112 has an angle γ of 50°. An outer pin hole 104 is also visible.

It would be conceivable for the tooth tips of the thick and thin teeth to be arranged so as to be offset with respect to one another in an axial direction.

Figure 11A:
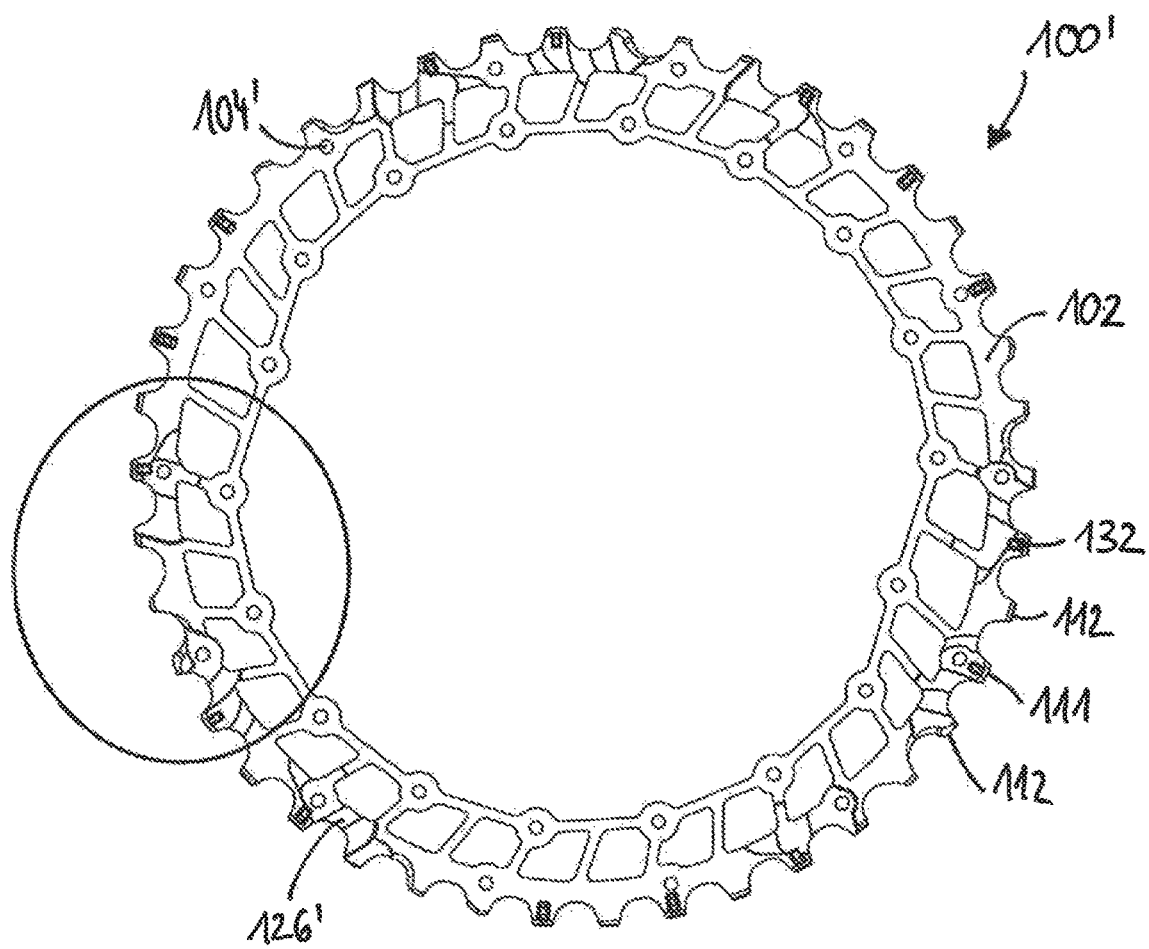
FIG. 11A shows an outside view of an embodiment of a sprocket.
Figure 11B:
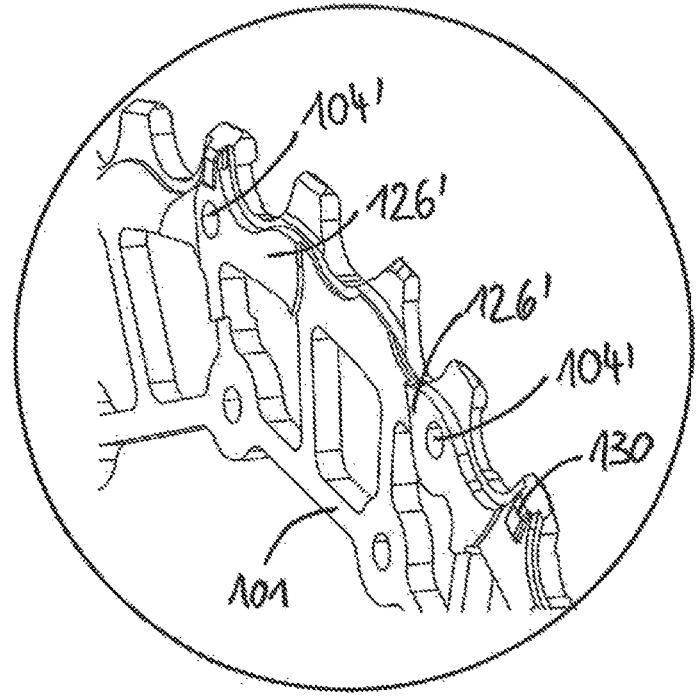
FIG. 11B shows an inside view of an enlarged detail of FIG. 11A.

FIGS. 11a and 11b show an alternative to the arrangement of the pin holes 104 shown and described in FIG. 5. FIG. 11A shows the outer side 102 of a chain ring 100' with thick and thin teeth 111, 112. In the alternative embodiment, the gearshift channels 126' are duly also produced by stamping, but the material is pushed through from the outer side 101 toward the inner side 102. The pushed-through material of the gearshift channels 126' or depression 127' can be seen particularly clearly in the enlarged detail view of the inner side 101 in FIG. 11B. The material thickness or axial width B3 of the sprocket body 120 is maintained. On the inner side 101, on which the projections 130 are also arranged, the additional material of the gearshift channels 126' does not pose an obstruction.

By contrast to this, the gearshift channels 126 or depressions of the previous embodiment were produced by stamping only on the inner side 101, but are not visible on the outer side 102—that is to say, the material thickness in the region of the gearshift channels 126 is smaller than the thickness of the starting material B3. As a result, the structure is not weakened further by the pin holes 104 in the region of the gearshift channels 126. Since, in this alternative embodiment, no material weakening occurs in the region of the gearshift channels 126', the pin holes 104' can be arranged within the gearshift channels 126'. A relocation of the holes out of the region of the gearshift channels is no longer necessary. Owing to the omitted limitations, it is possible for fewer pin holes 104', in this case 14 instead of 15 pin holes 104, to be distributed uniformly along the outer hole circle 106' of the sprocket 100'.

It is basically possible for different types of stamped formations to be generated by suitable molding tools. Either the material deformation is pushed through from one side to the other side, as is the case with the projections 130 and the gearshift channels 126' (deformation on both sides), or the deformation is performed only on one selected side, as is the case with the gearshift channels 126 and the recesses 124 (deformation on one side). The deformation on one side requires considerably higher punching forces than that on both sides, because the material cannot be displaced.

Proceeding from the original material thickness, the teeth 110 and the apertures 109 of the sprockets 100 are firstly coarsely pre-punched. The gearshift channels 126, recesses 124 and projections 130 are subsequently stamped. Said stamping may be performed in multiple steps and leads to the final material thickness. The tooth contours and the sprocket contours are finally subjected once again to a precision punching process.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A multi-sprocket arrangement for rotatable mounting on a rear-wheel axle and in an engagement with a bicycle chain having chain inner link plate pairs and chain outer link plate pairs, comprising:
   a sprocket having, between an axial inner side and an oppositely situated axial outer side, a flat sprocket body and a plurality of teeth formed on a circumference of the sprocket, the plurality of teeth comprising:
      a first tooth group, an axial width of which are dimensioned to be greater than a chain inner link plate spacing and smaller than a chain outer link plate spacing, and
      a second tooth group, an axial width of which are dimensioned to be smaller than the chain inner link plate spacing,
   wherein, when viewed in a circumferential direction, at least one sequence of three teeth is provided in which a tooth of the second tooth group, a tooth of the first tooth group and another tooth of the second tooth group are arranged directly in succession, and the tooth of the first tooth group has a projection in an axial direction, which is produced by a material deformation,
   wherein the entire flat sprocket body has an axial width which substantially corresponds to the axial width of the teeth of the second tooth group and is smaller than the axial width of at least one tooth of the first tooth group,
   wherein a fraction of teeth of the first tooth group in the total number of teeth amounts to less than 50%.

2. The multi-sprocket arrangement according to claim 1, wherein the projection is formed on the axial inner side of the sprocket.

3. The multi-sprocket arrangement according to claim 1, wherein the projection extends in a radial direction from a tooth tip to a tooth root of the at least one tooth of the first tooth group.

4. The multi-sprocket arrangement according to claim 1, wherein the projection extends in a radial direction as far as, but not beyond, a root circle diameter.

5. The multi-sprocket arrangement according to claim 1, wherein the projection is of U-shaped or V-shaped form as viewed in a section plane orthogonal to a radial line of the sprocket.

6. The multi-sprocket arrangement according to claim 1, wherein the sprocket has, on its axial inner side, in each case one recess for receiving a chain inner link plate in the region of the teeth of the second tooth group.

7. The multi-sprocket arrangement according to claim 1, wherein the sprocket has, on its axial outer side, a gearshift channel in the form of at least one depression.

8. The multi-sprocket arrangement according to claim 1, wherein the material deformation of the first projection is generated from the axial inner side or from the axial outer side.

9. The multi-sprocket arrangement according to claim 1, wherein the material deformation of the projection is generated by impressing, in particular stamping.

10. The multi-sprocket arrangement according to claim 1, wherein the sprocket comprises an even total number of teeth.

11. The multi-sprocket arrangement according to claim 1, wherein the fraction of teeth of the first tooth group in the total number of teeth equals between 37.5% and 25%.

12. The multi-sprocket arrangement according to claim 1, wherein the sprocket is a largest or a second-largest sprocket of the multi-sprocket arrangement.

13. The multi-sprocket arrangement according to claim 12, wherein the sprocket is formed as a discrete sprocket.

14. The multi-sprocket arrangement according to claim 13, wherein the discrete sprocket is connected to an adjacent sprocket by axially extending connecting member.

15. The multi-sprocket arrangement according to claim 14, wherein the discrete sprocket is connected to the adjacent sprocket by pins.

16. The multi-sprocket arrangement according to claim 15, wherein the discrete sprocket has radially outer pin openings for connection to a next-larger sprocket or radially inner pin openings for connection to a next-smaller sprocket.

17. A bicycle drive comprising:
   a multi-sprocket arrangement for rotatable mounting on a rear-wheel axle and in an engagement with a bicycle chain having chain inner link plate pairs and chain outer link plate pairs, comprising:
      a sprocket having, between an axial inner side and an oppositely situated axial outer side, a flat sprocket body and a plurality of teeth formed on a circumference of the sprocket, the plurality of teeth comprising:

a first tooth group, an axial width of which are dimensioned to be greater than a chain inner link plate spacing and smaller than a chain outer link plate spacing, and a second tooth group, an axial width of which are dimensioned to be smaller than the chain inner link plate spacing, wherein, when viewed in a circumferential direction, at least one sequence of three teeth is provided in which a tooth of the second tooth group, a tooth of the first tooth group and another tooth of the second tooth group are arranged directly in succession, and the tooth of the first tooth group has a projection in an axial direction, which is produced by a material deformation, wherein the entire flat sprocket body has an axial width which substantially corresponds to the axial width of the teeth of the second tooth group and is smaller than the axial width of at least one tooth of the first tooth group, wherein a fraction of teeth of the first tooth group in the total number of teeth amounts to less than 50%;

a rear gear shift mechanism, exactly one front chain ring arrangement with at least one chain ring; and the bicycle chain configured to engage with the at least one chain ring and with the sprocket of the multi-sprocket arrangement.

18. A sprocket for use in a multi-sprocket assembly attachable to a rear wheel of a bicycle, the sprocket comprising: a flat sprocket body the flat sprocket body comprising an attachment portion configured for attachment to another sprocket of the multi-sprocket assembly, and a plurality of teeth formed on a circumference of the flat sprocket body, the plurality of teeth comprising:

a first tooth group, an axial width of which are dimensioned to be greater than a chain inner link plate spacing and smaller than a chain outer link plate spacing, and a second tooth group, an axial width of which are dimensioned to be smaller than the chain inner link plate spacing, wherein, when viewed in a circumferential direction, at least one sequence of three teeth is provided in which a tooth of the second tooth group, a tooth of the first tooth group and another tooth of the second tooth group are arranged directly in succession, and the tooth of the first tooth group has a projection in an axial direction, which is produced by a material deformation, wherein the entire flat sprocket body has an axial width which substantially corresponds to the axial width of the teeth of the second tooth group and is smaller than the axial width of at least one tooth of the first tooth group, wherein a fraction of teeth of the first tooth group in the total number of teeth amounts to less than 50%.

* * * * *